(12) United States Patent
Riley

(10) Patent No.: US 8,321,120 B2
(45) Date of Patent: Nov. 27, 2012

(54) SYSTEM AND METHOD FOR STARTING A GAS TURBINE ENGINE WITH INOPERABLE EXHAUST GAS TURBINE TEMPERATURE SENSOR

(75) Inventor: Harold Riley, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 651 days.

(21) Appl. No.: 12/355,395

(22) Filed: Jan. 16, 2009

(65) Prior Publication Data

US 2010/0185377 A1 Jul. 22, 2010

(51) Int. Cl.
*G06G 7/64* (2006.01)

(52) U.S. Cl. .......................................... 701/100; 60/778

(58) Field of Classification Search .................. 701/100; 60/778

See application file for complete search history.

(56) References Cited

U.S. PATENT DOCUMENTS

| | | | |
|---|---|---|---|
| 3,377,848 A | 4/1968 | Marvin | |
| 4,599,568 A | 7/1986 | Couch | |
| 4,604,701 A | 8/1986 | Fujawa et al. | |
| 4,834,622 A | 5/1989 | Schuh | |
| 4,908,618 A | 3/1990 | Baker et al. | |
| 5,080,496 A | 1/1992 | Keim et al. | |
| 5,212,943 A * | 5/1993 | Harris | 60/790 |
| 5,436,826 A | 7/1995 | O'Flarity | |
| 5,844,383 A * | 12/1998 | Denaci | 318/139 |
| 6,115,654 A | 9/2000 | Eid et al. | |
| 6,434,476 B1 | 8/2002 | Zagone | |
| 7,020,595 B1 | 3/2006 | Adibhatla et al. | |
| 7,143,584 B2 * | 12/2006 | McKelvey et al. | 60/778 |
| 7,216,489 B2 | 5/2007 | Uluyol et al. | |
| 7,246,024 B2 | 7/2007 | Muramatsu et al. | |
| 7,340,901 B2 * | 3/2008 | Riley | 60/773 |
| 2003/0110777 A1 * | 6/2003 | O'Connor | 60/778 |
| 2004/0200207 A1 * | 10/2004 | McKelvey et al. | 60/39.281 |
| 2004/0237535 A1 * | 12/2004 | Ainsworth | 60/772 |
| 2005/0080527 A1 | 4/2005 | Tao et al. | |
| 2006/0267406 A1 | 11/2006 | Mehrer et al. | |
| 2007/0005219 A1 * | 1/2007 | Muramatsu et al. | 701/100 |
| 2007/0084214 A1 | 4/2007 | Schmidt et al. | |
| 2007/0118270 A1 | 5/2007 | Wiseman et al. | |
| 2007/0234734 A1 | 10/2007 | Uluyol et al. | |

* cited by examiner

*Primary Examiner* — Mary Cheung
*Assistant Examiner* — Truc M Do
(74) *Attorney, Agent, or Firm* — Ingrassia Fisher & Lorenz, P.C.

(57) ABSTRACT

A system and method are provided for controlling the start-up of a gas turbine engine having an exhaust gas temperature (EGT) sensor. A determination is made as to whether the EGT sensor is available or unavailable. The gas turbine engine is commanded to accelerate at a nominal acceleration rate during the start-up operation if the EGT sensor is available, and to accelerate at an off-nominal acceleration rate during the start-up operation if the EGT sensor is unavailable. The off-nominal acceleration rate is lower than the nominal acceleration rate.

15 Claims, 2 Drawing Sheets

SYSTEM AND METHOD FOR STARTING A GAS TURBINE ENGINE WITH INOPERABLE EXHAUST GAS TURBINE TEMPERATURE SENSOR

STATEMENT REGARDING FEDERALLY SPONSORED RESEARCH OR DEVELOPMENT

This invention was made with Government support under contract number FA8208-07-D-002-006 awarded by the U.S. Air Force. The Government has certain rights in this invention.

TECHNICAL FIELD

The present invention generally relates to gas turbine engines and, more particularly, to a system and method for starting a gas turbine engine when its associated exhaust gas temperature sensor is inoperable or otherwise unavailable.

BACKGROUND

In many aircraft, main propulsion engines not only provide propulsion for the aircraft, but may also be used to drive various other rotating components such as, for example, generators, compressors, and pumps, to thereby supply electrical and/or pneumatic power. However, when an aircraft is on the ground, its main engines may not be operating. Moreover, in some instances the main propulsion engines may not be capable of supplying the power needed for propulsion as well as the power to drive these other rotating components. Thus, many aircraft include an auxiliary power unit (APU) to supplement the main propulsion engines in providing electrical and/or pneumatic power. An APU may also be used to start the propulsion engines.

An APU is typically a gas turbine engine that includes a combustion section, a power turbine section, and a compressor section. During operation of the APU, the compressor section draws in and compresses ambient air and supplies the air to the combustion section. Fuel is injected into the compressed air within the combustion section to produce the high-energy combusted air to the power turbine section. The power turbine section rotates to drive a generator for supplying electrical power, via a main shaft, and to drive its own compressor section and/or an external load compressor.

Many APUs include an exhaust gas temperature (EGT) sensor. The EGT sensor, as its nomenclature denotes, senses the temperature of the exhaust gas discharged from the APU. If the EGT sensor becomes inoperable or otherwise unavailable, the APU may be prevented from being started up. This is done to prevent the APU from experiencing undesirably high temperatures during start-up, which can concomitantly reduce the overall life of the APU. For some aircraft operating scenarios, it would be desirable to allow an APU to be started up even though the EGT sensor may be inoperable or otherwise unavailable.

Hence, there is a need for a system and method of starting an APU when its associated EGT sensor is inoperable or otherwise unavailable while preventing the APU from experiencing undesirably high temperatures. The present invention addresses at least this need.

BRIEF SUMMARY

In one embodiment, and by way of example only, a gas turbine engine system includes a gas turbine engine, an exhaust gas temperature (EGT) sensor, and a controller. The gas turbine engine is adapted to receive fuel and air and is configured to controllably combust a mixture of the fuel and the air and discharge at least a portion of the combusted fuel air mixture as exhaust gas. The EGT sensor is configured to sense the exhaust gas temperature and supply an EGT sensor signal representative thereof. The controller is coupled to receive the EGT sensor signal and is operable to determine whether the EGT sensor signal is available or unavailable, command a nominal acceleration rate of the gas turbine engine during a start-up operation of the gas turbine engine if the EGT sensor signal is available, and command an off-nominal acceleration rate of the gas turbine engine during a start-up operation of the gas turbine engine if the EGT sensor signal is unavailable. The off-nominal acceleration rate is lower than the nominal acceleration rate.

In another exemplary embodiment, an engine controller for a gas turbine engine having an exhaust gas temperature (EGT) sensor includes light-off logic and acceleration command logic. The light-off logic is operable to selectively supply an enable signal. The acceleration command logic is coupled to receive the enable signal from the light-off logic and is adapted to receive an EGT loss signal whenever a sensor signal from the EGT sensor is unavailable. The acceleration command logic is operable, upon receipt of the enable signal, to supply acceleration rate commands. The acceleration rate commands are nominal acceleration rate commands if the EGT loss signal is not received, and are off-nominal acceleration rate commands if the EGT loss signal is received. For equivalent conditions, the off-nominal acceleration rate commands are lower than the nominal acceleration rate commands.

In yet another exemplary embodiment, a method of controlling a gas turbine engine during a start-up operation, for a gas turbine engine having an exhaust gas temperature (EGT) sensor includes determining whether the EGT sensor is available or unavailable. The gas turbine engine is commanded to accelerate at a nominal acceleration rate during the start-up operation if the EGT sensor is available, and to accelerate at an off-nominal acceleration rate during the start-up operation if the EGT sensor is unavailable. The off-nominal acceleration rate is lower than the nominal acceleration rate.

Furthermore, other desirable features and characteristics of the gas turbine engine system, controller, and method will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the system and method are described as being implemented in an auxiliary power unit, it will be appreciated that the system and method may also be implemented in various other gas turbine engines. Moreover, while control logic configurations are, for clarity and ease of description, depicted and described herein using discrete logic representations, it will be appreciated that the control logic may be implemented in hardware, software, firmware, or various combinations thereof.

Figure 1:
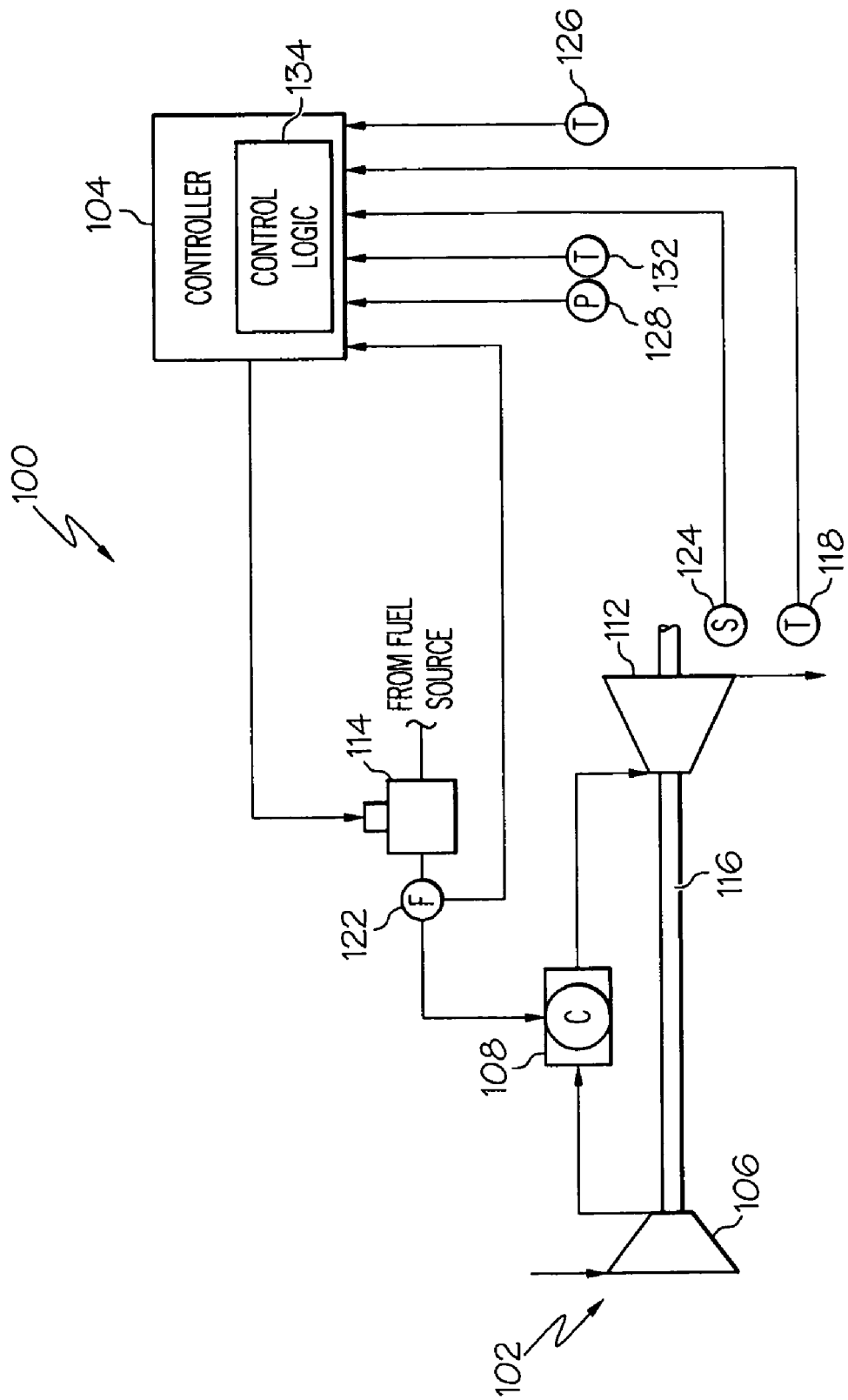
FIG. 1 depicts a schematic representation of an exemplary embodiment of a gas turbine engine system.

Referring now to FIG. 1, a schematic representation of an exemplary gas turbine engine system 100 is depicted. The depicted system is more specifically an auxiliary power unit (APU) system 100 and includes an APU 102 and a controller 104. The APU 102 includes a compressor 106, a combustor 108, and a turbine 112. During operation of the APU 102, the compressor 106 draws in ambient air, compresses it, and directs the compressed air into the combustor 108. In the depicted embodiment, only a single compressor 106 is shown, though it will be appreciated that one or more additional compressors could be used.

In the combustor 108, the compressed air supplied from the compressor 106 is mixed with fuel that is controllably supplied from a non-illustrated fuel source via, for example, a fuel metering valve 114. The fuel/air mixture is combusted, via non-illustrated igniters, to generate high energy combusted gas that is then directed into the turbine 112. The turbine 112 may include one or more turbines. In the depicted embodiment, only a single turbine is included. No matter the particular number, the combusted gas from the combustor 108 expands through the turbine 112, causing it to rotate. As the turbine 112 rotates, it drives the compressor 106 via a spool 116.

The controller 104 controls the operation of the APU 102. More specifically, the controller 104 receives signals from various sensors and systems and, in response to these signals, controls the APU 102 during start-up, operation, and shut-down modes. Included among the signals supplied to the controller 104 are an exhaust gas temperature (EGT) signal, which is supplied from an EGT sensor 118, and a rotational speed signal, which is supplied from a speed sensor 124 in the APU 102. In the depicted embodiment, a fuel flow signal is also supplied to the controller. This signal, if supplied, may be supplied from a fuel flow sensor 122. It will be appreciated, however, that in many embodiments, this signal is not included.

The controller 104 also receives external sensor signals from a plurality of external sensors. The external sensor signals are each representative of a sensed parameter that is external of the APU 102. The external sensors and sensor signals may vary, but in the depicted embodiment, the external sensors include a lubricant temperature sensor 126, an ambient pressure sensor 128, and an ambient temperature sensor 132. The lubricant temperature sensor 126 senses the temperature of the lubricant (e.g., oil) that is supplied to the APU and supplies a lubricant temperature signal representative thereof. The ambient pressure sensor 128 senses ambient pressure and supplies an ambient pressure signal representative thereof. The ambient temperature sensor 132 senses ambient temperature and supplies an ambient temperature signal representative thereof.

Figure 2:
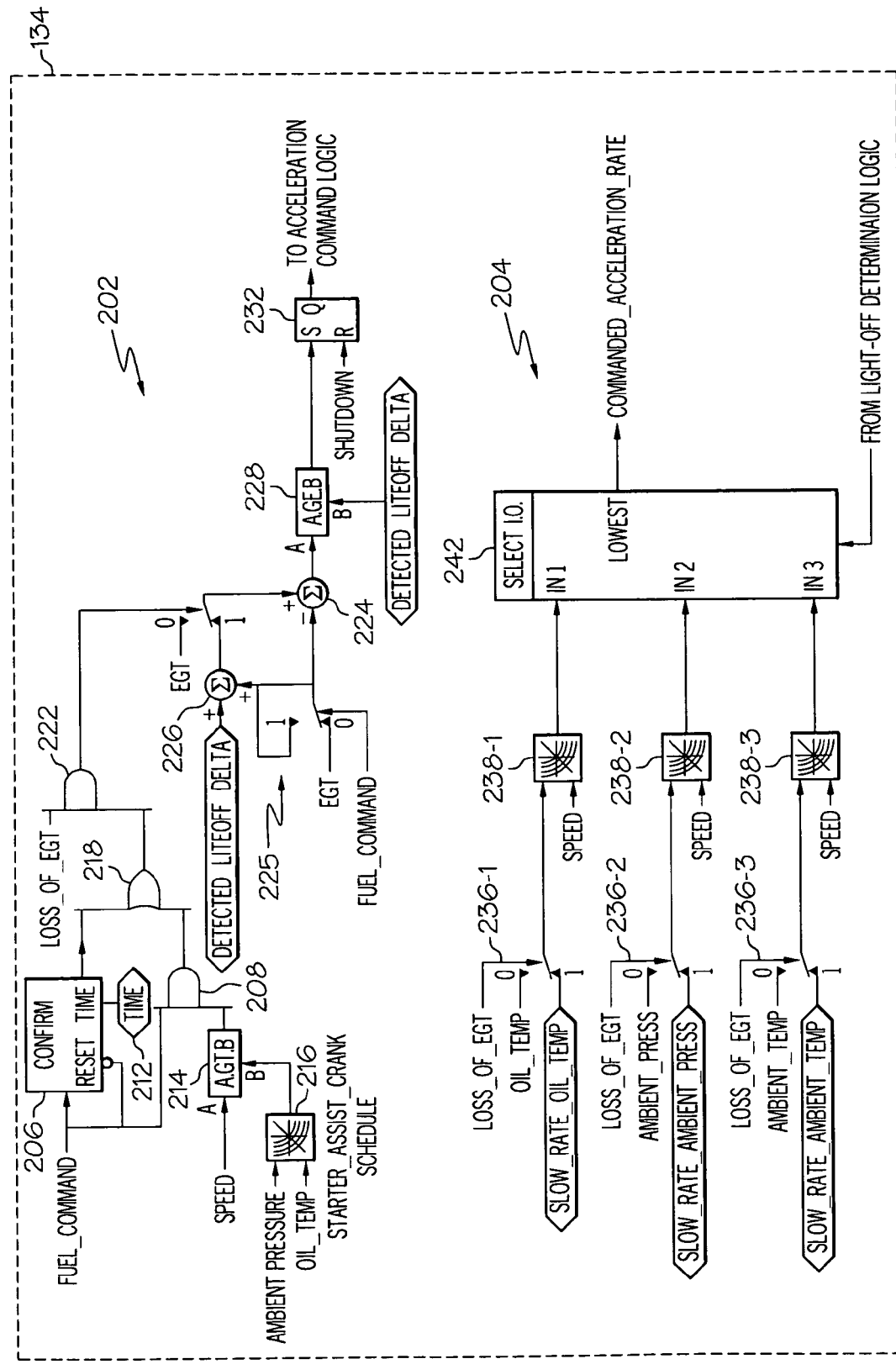
FIG. 2 depicts a schematic representation of control logic that may be used to implement start-up control of the gas turbine engine of FIG. 1.

The manner in which the controller 104 operates to control the overall operation of the APU 102 during the operation mode and the shut-down mode may vary. Indeed, such variations may be readily apparent to a person of skill in the art. Moreover, a description of the control during these operational modes is not needed to fully describe or enable the claimed invention, and will therefore not be further provided. When the controller 104 is controlling the APU 102 in the start-up mode, the controller 104 implements control logic 134 that controllably starts the APU 102, even if the EGT sensor 118 is inoperable or otherwise unavailable. In particular, and as will now be described in more detail, the controller 104 determines whether the EGT sensor 118 is operable or inoperable. If the EGT sensor 118 is operable, the control logic 134 supplies nominal acceleration rate commands to the APU 102 during at least a portion of the start-up operational mode. If, however, the EGT sensor 118 is inoperable, the control logic 134 supplies off-nominal acceleration rate commands the APU 102 during at least a portion of the start-up operational mode. It is noted that, for equivalent conditions, off-nominal acceleration rate commands are lower than nominal acceleration rate commands. A functional block diagram of at least a portion the control logic 134 is depicted in FIG. 2, and with reference thereto, will now be described.

The control logic 134 includes light-off determination logic 202 and acceleration command logic 204. The light-off determination logic 202 is configured to determine when a light-off of the APU 102 is being commanded and, based on this determination, to selectively enable (or trigger) the acceleration command logic 204. To implement its functionality, at least in the depicted embodiment, the light-off determination logic 202 is coupled to receive a FUEL_COMMAND signal indicating that a fuel supply command is being generated. The FUEL_COMMAND signal may indicate, for example, that the above-described fuel metering valve 114 is being energized to open.

No matter its particular source, it is seen that the FUEL_COMMAND signal, when generated, is supplied to CONFIRMATION logic 206 and, at least in the depicted embodiment, to first AND logic 208. The CONFIRMATION logic 206, as is generally known, is configured to supply a logical-TRUE at its output whenever a logical-TRUE has been supplied to its input for a preset time. That is, whenever a logical-TRUE has been supplied to its input for the time period specified by a value 212 that is supplied to its TIME port. It will be appreciated that the value supplied to the TIME port may vary. In one particular embodiment the value 212 is 3.0 seconds, though this value may vary from engine to engine.

The first AND logic 208, if included, is coupled to receive the FUEL_COMMAND signal and a signal that is supplied from first COMPARATOR logic 214, and outputs a logical-TRUE when both of these signals are logical-TRUE. The first COMPARATOR logic 214 is coupled to receive a SPEED signal and the output of a STARTER_ASSIST_CRANK schedule 216. The SPEED signal is representative of the rotational speed of the APU 102, which may be supplied from the above-described speed sensor 124. The STARTER_ASSIST_CRANK schedule 216 is coupled to receive a PRESSURE signal and an OIL_TEMP signal, which may be supplied from the above-described ambient pressure sensor 128 and lubricant temperature sensor 126, respectively. The first COMPARATOR logic 214 is configured as "greater-than" logic. As such, it outputs a logical-TRUE whenever the SPEED signal is greater than the output of the STARTER_ASSIST_CRANK schedule 216.

The CONFIRMATION logic 206 and the AND logic 208 are each coupled to separate inputs of OR logic 218. It may thus be appreciated that the OR logic 218 outputs a logical-TRUE whenever the CONFIRMATION logic 206 or the AND logic 208 or both output a logical-TRUE. Before proceeding, it is noted that in some embodiments, the logic associated with the rotational speed of the APU 102, and in particular the AND logic 208, the first COMPARATOR logic 214, and the STARTER_ASSIST_CRANK schedule 216 need not be included. It will be appreciated that in such embodiments, the OR logic 218 may also be eliminated, and the output of the CONFIRMATION logic 206 supplied directly to second AND logic 222, which will now be described.

The second AND logic 222 is coupled to receive the output of the OR logic 218 and a LOSS_OF_EGT signal, and outputs a logical-TRUE when both of these signals are logical- TRUE. In the depicted embodiment, the LOSS_OF_EGT signal is a logical-TRUE whenever the EGT sensor 118 is determined to be inoperable or otherwise unavailable, or at least the EGT sensor signal supplied from the EGT sensor 118 is, for any one of numerous reasons, unavailable. Otherwise, the LOSS_OF_EGT signal is a logical-FALSE.

As FIG. 2 further depicts, whenever the LOSS_OF_EGT signal is a logical-FALSE, which it normally is, the EGT signal from the EGT sensor 118 is supplied to the (+) input of first SUMMATION logic 224. The (−) input of first SUMMATION logic 224 receives one of two signals, depending on the state of the FUEL_COMMAND signal discussed above. In particular, if the FUEL_COMMAND signal is a logical-FALSE, then the (−) input also receives the EGT signal from the EGT sensor 118. Conversely, if the FUEL_COMMAND signal is a logical-TRUE, the value of the EGT sensor signal at the time when the FUEL_COMMAND signal transitioned to a logical-TRUE is latched, via HOLD logic 225, and supplied to the (−) input.

The first SUMMATION logic 224 is configured to subtract the value at its (−) input from the value at its (+) input and supply a signal representative of the difference. It may thus be appreciated that whenever the EGT sensor 118 is operable (and the EGT sensor signal is thus available) and the FUEL_COMMAND signal is a logical-FALSE, the first SUMMATION logic 224 supplies a signal representative of zero (0). Additionally, whenever the EGT sensor 118 is operable (and the EGT sensor signal is thus available) and the FUEL_COMMAND signal is a logical-TRUE, the first SUMMATION logic 224 supplies a signal representative of the difference between the value of the current EGT sensor signal and the value of the EGT sensor signal at the time when the FUEL_COMMAND signal transitioned to a logical-TRUE. The purpose for this is described more fully further below.

It is also seen that whenever the FUEL_COMMAND signal is a logical-TRUE, the value of the EGT sensor signal at the time when the FUEL_COMMAND signal transitioned to a logical-TRUE is also supplied to a first (+) input of second SUMMATION logic 226. A second (+) input of second SUMMATION logic 226 is coupled to receive a predetermined temperature value referred to herein as DETECTED_LITEOFF_DELTA. This is a value that is stored locally within the controller 104 in, for example, non-illustrated memory. The DETECTED_LITEOFF_DELTA value is also supplied to second COMPARATOR logic 228, as is the signal output from the first SUMMATION logic 224. The second COMPARATOR logic 228 is configured as "greater-than-or-equal-to" logic. As such, it outputs a logical-TRUE whenever the signal output from the first SUMMATION logic 224 is greater than or equal to the DETECTED_LITEOFF_DELTA value.

The second COMPARATOR logic 228 is coupled to the SET (S)-input of a discrete latch 232. The RESET (R)-input of the discrete latch 232 is coupled to receive a SHUTDOWN signal 234. The discrete latch 232 thus outputs a logical-TRUE whenever the S-input receives a logical-TRUE and the R-input receives a logical-FALSE. The discrete latch 232 will continue to output a logical-TRUE, even if the S-input no longer receives a logical-TRUE, until the R-input receives a logical-TRUE, at which point the discrete latch 232 will output a logical-FALSE.

From the above description, it may be understood that when the EGT sensor 118 is operable and supplying the EGT sensor signal, the light-off determination logic 202 will determine that a light-off of the APU 102 has occurred, and thus output a logical-TRUE, whenever the FUEL_COMMAND signal is a logical-TRUE and the EGT sensor 118 indicates that the EGT of the APU 102 has increased a predetermined amount since the FUEL_COMMAND signal transitioned to a logical-TRUE. The predetermined amount is equal to the DETECTED_LITOFF_DELTA value. It will be appreciated that this value may vary. As an example, in one particular embodiment this value is 300° F.

It may additionally be understood from the above description that when the EGT sensor 118 is inoperable or otherwise unavailable (or at least the EGT sensor signal is unavailable), and the FUEL_COMMAND signal is a logical-TRUE, the light-off determination logic 202 will determine that a light-off of the APU 102 has occurred, and thus output a logical-TRUE, if either of two conditions occur. One condition is that the APU 102 is rotating at a speed that is greater than any speed that the APU 102 could achieve without having assist associated with flame in the combustor 108. In the depicted embodiment, this is realized by the SPEED signal being greater than the value output by the STARTER_ASSIST_CRANK schedule 216. The other condition is that the FUEL_COMMAND signal has been a logical-TRUE for the preset time (e.g., the value of TIME). This latter condition covers those cases where start-assist may be degraded.

Whenever either of the above-two conditions occur, a temperature offset is added to whatever value the EGT signal was at the time the EGT sensor 118 became unavailable (e.g., the LOSS_OF_EGT signal transitioned to a logical-TRUE). The temperature offset is sufficient to ensure that the light-off determination logic 202 will output a logical-TRUE. In the depicted embodiment, and as was noted above and is shown in FIG. 2, the temperature offset is the DETECTED_LITOFF_DELTA value.

Whenever the light-off determination logic 202 outputs a logical-TRUE, it enables (or triggers) the acceleration command logic 204 to supply acceleration commands. The acceleration commands that the acceleration command logic 204 supplies are either nominal acceleration rate commands or off-nominal acceleration rate commands. As used herein, nominal acceleration rate commands are rate commands that the acceleration command logic 204 supplies whenever the EGT sensor 118 is operable, and off-nominal acceleration rate commands are rate commands that the acceleration command logic 204 supplies whenever the EGT sensor 118 is inoperable or otherwise unavailable (or at least the EGT sensor signal is unavailable). To implement this functionality, the acceleration rate command logic 204 includes a plurality of logic switches 236 (e.g., 236-1, 236-2, 236-3), a plurality of speed-referenced acceleration rate schedules 238 (e.g., 238-1, 238-2, 238-3), and SELECT LOW logic 242.

The logic switches 236 are each similarly configured. That is, each is configured to receive and supply either a sensor signal that is representative of a sensed parameter that is external of the APU 102 or an associated default value to one of the speed-referenced acceleration rate schedules 238. More specifically, the first logical switch 236-1 is coupled to receive the lubricant temperature signal supplied from the lubricant temperature sensor 126 and an associated default value SLOW_RATE_OIL_TEMP. The second logical switch 236-2 is coupled to receive the ambient pressure signal supplied from the ambient pressure sensor 128 and an associated default value SLOW_RATE_AMBIENT_PRESS. The third logical switch 236-3 is coupled to receive the ambient temperature signal supplied from the ambient temperature sensor 132 and an associated default value SLOW_RATE_AMBIENT_TEMP. Whenever the EGT sensor 118 is operable, and the LOSS_OF_EGT signal is thus a logical-FALSE, the logical switches 236 will each supply the sensor signal it receives to its associated speed-referenced acceleration rate schedule 238. Conversely, whenever the EGT sensor 118 is inoperable or otherwise unavailable (or at least the EGT sensor signal is unavailable), and the LOSS_OF_EGT signal is thus a logical-TRUE, the logical switches 236 will each supply the default value it receives to its associated speed-referenced acceleration rate schedule 238.

The speed-referenced acceleration rate schedules 238 are each coupled to receive the output of its associated logical switch 236 and to receive the SPEED signal from, for example, the speed sensor 124. The speed-referenced acceleration rate schedules 238 are each configured to supply rate commands based on the signals it receives. Hence, the first speed-referenced acceleration rate schedule 238-1 supplies rate commands based on lubricant temperature and APU rotational speed, where the lubricant temperature is either the sensed lubricant temperature (when the EGT sensor 118 is operable) or the default lubricant temperature value (when the EGT sensor 118 is inoperable or otherwise unavailable). The second speed-referenced acceleration rate schedule 238-2 supplies rate commands based on ambient pressure and APU rotational speed, where the ambient pressure is either the sensed ambient pressure (when the EGT sensor 118 is operable) or the default ambient pressure value (when the EGT sensor 118 is inoperable or otherwise unavailable). Similarly, the third speed-referenced acceleration rate schedule 238-3 supplies rate commands based on ambient temperature and APU rotational speed, where the ambient temperature is either the sensed ambient temperature (when the EGT sensor 118 is operable) or the default ambient temperature value (when the EGT sensor 118 is inoperable or otherwise unavailable).

The SELECT LOW logic 242 is coupled to receive the rate commands supplied from each of the speed-referenced acceleration rate schedules 238. The SELECT LOW logic is also coupled to receive the signal output from the light-off determination logic 202. The signal from the light-off determination logic 202, depending on its state, will either enable or disable the SELECT LOW logic 242. More specifically, when the light-off determination logic 202 outputs a logical-FALSE, then the SELECT LOW logic 242 is disabled. Conversely, when the light-off determination logic 202 outputs a logical-TRUE, then the SELECT LOW logic 242 is enabled. When enabled, the SELECT LOW logic 242, as its nomenclature denotes, determines which of the rate commands it receives is the lowest, and supplies the lowest as the acceleration rate command (COMMAND_ACCELERATION_RATE) to the APU 102.

It is noted that the sensed parameters supplied to the logical switches 236 need not be lubricant temperature, ambient pressure, and ambient temperature. Indeed, in other embodiments one or more of these parameters may vary. Moreover, embodiments are not limited to the use of three parameters. Indeed, more or less than three parameters could be used. In addition, the parameters need not be limited to external parameters but could include parameters within the APU 102. Preferably, however, there is a logical switch 236, a default value, and a speed-referenced acceleration rate schedule associated with each of the parameters. Furthermore, the specific numeric values of each of the default values may vary. However, each numeric value is selected such that, when the default values are supplied to the speed-referenced acceleration rate schedules 238 (e.g., LOSS_OF_EGT is a logical-TRUE), the acceleration rate commands that each speed-referenced acceleration rate schedule 238 supplies are sufficiently low so that the concomitant acceleration of the APU 102 is low enough to remain protected from an excessive EGT during the start-up operational mode.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine system, comprising:
   a gas turbine engine adapted to receive fuel and air and configured to (i) controllably combust a mixture of the fuel and the air and (ii) discharge at least a portion of the combusted fuel air mixture as exhaust gas;
   an exhaust gas temperature (EGT) sensor configured to sense exhaust gas temperature and supply an EGT sensor signal representative thereof; and
   a controller configured to implement a plurality of speed-referenced acceleration rate schedules, the controller coupled to receive the EGT sensor signal and operable to:
   (i) determine whether the EGT sensor signal is available or unavailable,
   (ii) command a nominal acceleration rate of the gas turbine engine during a start-up operation of the gas turbine engine if the EGT sensor signal is available, and
   (iii) command an off-nominal acceleration rate of the gas turbine engine during a start-up operation of the gas turbine engine if the EGT sensor signal is unavailable, wherein the off-nominal acceleration rate is lower than the nominal acceleration rate,
   wherein the acceleration rate that the controller commands is supplied from one of the speed-referenced acceleration rate schedules.

2. The gas turbine engine system of claim 1, wherein:
   each speed-referenced acceleration rate schedule supplies an acceleration rate; and
   the controller determines which of the supplied acceleration rates is lowest;
   the acceleration rate that the controller commands is the lowest.

3. The gas turbine engine system of claim 1, wherein:
   the controller is adapted to receive a plurality of external sensor signals, each external sensor signal representative of a sensed parameter that is external of the gas turbine engine;
   the controller has stored therein a plurality of default values, each default value corresponding to one of the sensed parameters;
   the acceleration rate supplied from each speed-referenced acceleration rate schedule is based on an associated one of the sensed parameters;
   each speed-referenced acceleration rate schedule uses the external sensor signal representative of its associated sensed parameter if the EGT sensor signal is available; and
   the speed-referenced acceleration rate schedule uses the default value that corresponds to its associated sensed parameter if the EGT sensor signal is unavailable.

4. The gas turbine engine system of claim 3, wherein the plurality of external sensor signals comprise:
   a lubricant temperature sensor signal representative of lubricant temperature;
   an ambient pressure sensor signal representative of ambient pressure; and
   an ambient temperature sensor signal representative of ambient temperature.

5. The gas turbine engine system of claim 1, wherein the controller implements light-off determination logic that enables the controller to command the off-nominal acceleration rate when the EGT sensor signal is unavailable.

6. The gas turbine engine system of claim 5, wherein the light-off determination logic:
is adapted to receive a fuel command signal indicating that a fuel supply command is being generated; and
enables the controller to command the off-nominal acceleration rate when the EGT sensor signal is unavailable only if the fuel supply command is generated for a predetermined time period.

7. The gas turbine engine system of claim 5, wherein the light-off determination logic:
is adapted to receive a speed signal representative of gas turbine rotational speed and a fuel command signal indicating that a fuel supply command is being generated; and
enables the controller to command the off-nominal acceleration rate when the EGT sensor signal is unavailable only if (i) the gas turbine rotational speed exceeds a predetermined speed and (ii) the fuel supply command is generated for a predetermined time period.

8. An engine controller for a gas turbine engine having an exhaust gas temperature (EGT) sensor, the engine controller comprising:
light-off logic operable to selectively supply an enable signal; and
acceleration command logic coupled to receive the enable signal from the light-off logic and adapted to receive an EGT loss signal whenever a sensor signal from the EGT sensor is unavailable, the acceleration command logic operable, upon receipt of the enable signal, to supply acceleration rate commands,
wherein:
the acceleration rate commands are nominal acceleration rate commands if the EGT loss signal is not received,
the acceleration rate commands are off-nominal acceleration rate commands if the EGT loss signal is received,
for equivalent conditions, the off-nominal acceleration rate commands are lower than the nominal acceleration rate commands,
the acceleration command logic includes a plurality of speed-referenced acceleration rate schedules, and
the acceleration rate commands are supplied from one of the speed-referenced acceleration rate schedules.

9. The engine controller of claim 8, wherein:
each speed-referenced acceleration rate schedule supplies acceleration rates; and
the acceleration command logic further includes selection logic that determines which of the supplied acceleration rates are lowest and supplies the lowest acceleration rates as the acceleration commands.

10. The engine controller of claim 8, wherein:
the acceleration command logic is further adapted to receive a plurality of external sensor signals, each external sensor signal representative of a sensed parameter that is external of a gas turbine engine;
the acceleration command logic is adapted to receive a plurality of stored default values, each default value corresponding to one of the sensed parameters;
the acceleration rate supplied from each speed-referenced acceleration rate schedule is based on an associated one of the sensed parameters;
each speed-referenced acceleration rate schedule uses the external sensor signal representative of its associated sensed parameter if the EGT loss signal is not present; and
each speed-referenced acceleration rate schedule uses the default value that corresponds to its associated sensed parameter if the EGT loss signal is present.

11. The engine controller of claim 10, wherein the plurality of external sensor signals comprises:
a lubricant temperature sensor signal representative of lubricant temperature;
an ambient pressure sensor signal representative of ambient pressure; and
an ambient temperature sensor signal representative of ambient temperature.

12. The engine controller of claim 8, wherein the light-off determination logic is adapted to receive the EGT loss signal and a fuel command signal indicating that a fuel supply command is being generated, the light-off determination logic operable to supply the enable signal to the acceleration command logic when the EGT loss signal is present only if the fuel supply command is generated for a predetermined time period.

13. The engine controller of claim 11, wherein the light-off determination logic is adapted to receive the EGT loss signal, a speed signal representative of gas turbine rotational speed, and a fuel command signal indicating that a fuel supply command is being generated, the light-off determination logic operable to supply the enable signal to the acceleration command logic when the EGT loss signal is present only if (i) the gas turbine rotational speed exceeds a predetermined speed and (ii) the fuel supply command is generated for a predetermined time period.

14. A method of controlling a gas turbine engine during a start-up operation, for a gas turbine engine having an exhaust gas temperature (EGT) sensor, the method comprising the steps of:
determining whether the EGT sensor is available or unavailable;
commanding the gas turbine engine to accelerate at a nominal acceleration rate during the start-up operation, if the EGT sensor is available, and
commanding the gas turbine engine to accelerate at an off-nominal acceleration rate during the start-up operation if the EGT sensor is unavailable, wherein the off-nominal acceleration rate is lower than the nominal acceleration rate;
wherein the acceleration rate that is commanded is supplied from one of a plurality of speed-referenced acceleration rate schedules.

15. The method of claim 14, wherein acceleration rates supplied from the speed-referenced acceleration rate schedules are based on a parameter that is external of the gas turbine engine, and wherein the method further comprises:
sensing the parameter and supply an external sensor signal representative thereof;
storing a default value of the sensed parameter;
basing the acceleration rates supplied from the speed-referenced acceleration rate schedules on the external sensor signal if the EGT sensor is available; and
basing the acceleration rates supplied from the speed-referenced acceleration rate schedule on the default value of the sensed parameter if the EGT sensor is unavailable.

* * * * *

UNITED STATES PATENT AND TRADEMARK OFFICE
CERTIFICATE OF CORRECTION

PATENT NO. : 8,321,120 B2
APPLICATION NO. : 12/355395
DATED : November 27, 2012
INVENTOR(S) : Harold Riley It is certified that error appears in the above-identified patent and that said Letters Patent is hereby corrected as shown below:

Column 1, line 10, "FA8208-07-D-002-006" should be changed to "FA8208-07-D-0002"

Signed and Sealed this
Second Day of April, 2013

Teresa Stanek Rea
*Acting Director of the United States Patent and Trademark Office*